(12) United States Patent
Strumpf et al.

(10) Patent No.: US 7,167,081 B2
(45) Date of Patent: Jan. 23, 2007

(54) COMMUNICATION MODULE AND PROCESS FOR NETWORKING WITHIN AND BETWEEN POWERED COMMUNICATION DEVICES OVER A MULTI-PHASE POWER DISTRIBUTION SYSTEM OR SUBSYSTEM

(76) Inventors: David M. Strumpf, P.O. Box 12906, Chas, SC (US) 29412; Daniel A. Drolet, P.O. Box 12906, Charleston, SC (US) 29412

( * ) Notice: Subject to any disclaimer, the term of this patent is extended or adjusted under 35 U.S.C. 154(b) by 292 days.

(21) Appl. No.: 10/978,312

(22) Filed: Oct. 14, 2004

(65) Prior Publication Data

US 2005/0129097 A1 Jun. 16, 2005

Related U.S. Application Data

(60) Provisional application No. 60/510,530, filed on Oct. 14, 2003.

(51) Int. Cl.
*G05B 11/01* (2006.01)
(52) U.S. Cl. ............... 340/310.13; 340/310.16; 375/219
(58) Field of Classification Search ......... 340/310.11, 340/310.13, 310.16, 538, 286.02; 370/467; 375/219
See application file for complete search history.

(56) References Cited

U.S. PATENT DOCUMENTS

| | | | | |
|---|---|---|---|---|
| 5,412,660 | A | * | 5/1995 | Chen et al. ............... 370/318 |
| 2003/0228005 | A1 | * | 12/2003 | Melick et al. ........... 379/93.01 |
| 2004/0172207 | A1 | * | 9/2004 | Hancock et al. ............ 702/60 |
| 2005/0129097 | A1 | * | 6/2005 | Strumpf et al. ............ 375/219 |

* cited by examiner

*Primary Examiner*—Brent A. Swarthout

(57) ABSTRACT

This invention allows the communication of mission critical data to devices that communicate within the same, or a separately connected, power distribution system. Devices operate by being connected to a power distribution system, subsystem, and or different but connected power system. Each device has a specific similar or different communication platform, architecture, protocol method and or process for performing a function and or distributing data. The invention allows all devices connected through the power system to communicate to one, some or all other devices as wanted; regardless of the type of architecture, protocol, platform, or type of power on the power system. Power systems can be connected by power or communication and can be separate. All powered devices utilizing the invention seamlessly operate, communicate and network for their specified reason(s) in their native formats without any needs of communication wiring using the power distribution system as the medium of communication.

23 Claims, No Drawings

COMMUNICATION MODULE AND PROCESS FOR NETWORKING WITHIN AND BETWEEN POWERED COMMUNICATION DEVICES OVER A MULTI-PHASE POWER DISTRIBUTION SYSTEM OR SUBSYSTEM This application is a continuation in part to provisional application filed on Oct. 14, 2003 with Application No. 60/510,530.

FIELD OF INVENTION

This invention relates to industrial, military, commercial and other data distribution devices having a power supply that operate by being connected to a power distribution system or subsystem, and that communicate independently and or between other communication devices; where each device has a specific communication platform, architecture, protocol, method and or process for performing a function or distributing data that may be different than other communicating devices operating on the power distribution system or subsystem;

And whereby the power phases of some or all devices on the power distribution network may be different;

And whereby secure and reliable data distribution for communication, control, automation or monitoring is required at the same time in real time to and from all powered devices within a power distribution system or subsystem;

BACKGROUND

Most existing communication technologies are not scaleable, or scale only under carefully controlled conditions. This not only threatens, but in general hampers overall technology development, network build-out or network efficiency, business operation efficiency, physical business growth, and overall financial growth and savings.

Specifically within business operations and the devices that these operations use that focus in industrial heavy commercial and military network systems, sub-systems and architectures for controls, monitoring, automation and overall communications; the communications between devices must be sure to have reliable, secure data in real time at all times distributed to and from one, some or all other functioning devices and architectures regardless of the environment around the functioning devices or architectures.

SUMMARY

The present invention relates to an apparatus and method for communication networking modules placed within a power distribution system. Each communication module is independently addressable and integrated into a power supplied device that is located within a power distribution system.

Each communication module, within a power supplied device created for communicating, is configured to communicate to other communication modules contained in other power supplied devices created for communicating. Each communication module within a power supplied device created for communicating regardless of the type of communication architecture, platform, protocol method or process the specific power supplied device was created for is able to communicate independently as well as to all other devices within the power distribution network.

The communication module communicates seamlessly and simultaneously to and from all existing and future network architectures, protocols, platforms within a power supplied device, and connected to a power distribution system, including, but not limited to RF, Wireline, Hybrid and Future Networking types, processes and methods.

Types, processes, and methods such as DSL, Coaxial, Fiber, Satellite, Dial-Up, Powerline, RS-232, RS-485, Modbus, Modbus Plus, Profibus, Interbus, CEBus, CANBus, CANopen, Seriplex, J1939, ControlNet, AS-Interface, DeviceNet, 802 wireless communications, Bluetooth, Zigbee, Ethernet TCP/IP, Industrial Ethernet, SNMP, IGMP, Homeplug or HPNA, LonWorks, Serial, USB, Parallel and others for the purposes of seamless communication. The seamless communication uses the power distribution system to send data to and from all devices with security and reliability, as well as provides the capabilities of allowing additional functions for control, automation, monitoring and overall communication at the same time in real time while choosing the most preferred frequency that allows the clearest and fastest data communications.

DESCRIPTION

A Standard 3-Dimensional Form Factor Communication Module for All Types of Communication Network Architectures Connected to a Power Distribution System or Subsystem The standard form factor for the communication module consists of a three (3)-dimensional Enclosure that stays constant across all power supplied devices regardless of the communications architecture, platform, protocol, process or method.

Within the three dimensional form-factor enclosure there exists and consists of specific printed circuit board layers that maintain specific surface mount technologies that work together with an embedded microprocessor, software, firmware and related hardware circuitry programmed to communicate to and from another device to learn and perform specific control monitoring, automation and other communication functions required, by or for, the specific powered device in which the communications module is contained.

QOS Efficiency Method—Packet Data Throughput

The physical communication of the carriers maintain physical trackers in silicon that allows the throughput of each carrier, and is validated in real time and repeated based on a number of retry parameters. Yet only for the number of retries that are necessary to yield a positive validation.

For example, if a source master node is requesting to send on Freq. 3, 5, & 6 and established a 15 retry maximum to the silicon, the physical response will yield multiple transmissions on channels 3, 5, & 6 but only until a positive validation is received back from the destination node to which it is sending. The silicon, based on the physical communication of the carriers that maintain physical trackers in real time, terminates the retry method as soon as a positive validation is received from the sending node. In an ideal system with no noise or whatsoever, the retries would never actually transmit beyond a single or one try because a positive validation would always be received for every "sent".

Beyond the physical hardware silicon response of hardware retries, there is then a secondary firmware embedded that maintains software retries that intelligently adapt to the number of hardware retries that previously occurred. This is the dynamic adaptability of the present invention. As the software retries are implemented, reallocation of frequency position and routing table assignments can be assigned in real time.

The more frequencies located on the system, the more probability of QOS throughput and faster speed of the system.

By maintaining a minimal # of tracking carriers that redundantly communicate with all nodes on these tracking carriers in order to maintain QOS, information throughout the network for example in an 8 frequency hopping system we dedicate 2 of the frequencies to talk to all nodes and report QOS that is statistically trending over time. The remaining channels are allocated to the preferred highest QOS carriers between specific nodes.

For example if there are 32 nodes, a specific or varying number of nodes, at some period of time, may have excellent frequency throughput (QOS) for example on frequencies 3, 5, & 6. The report on the redundant on the QOS channels alerts all nodes that these particular nodes are on channels 3, 5, 6 at that time. Other nodes of the 32 may not have any QOS integrity on 3, 5, 6 but may be performing adequately on frequency 2.

Therefore the system maps the preferred routing method to the highest QOS node to node probability. This means that the optimal frequency will be used to transmit each packet from source node to destination node with the highest probability of success.

This creates a dynamically adaptable real-time meshed networking scheme that works on multiple mediums, carriers, and modulation techniques. One of the important benefits is that it utilizes only the bandwidth necessary to move the data on the highest probable frequency channel throughput based on QOS history.

Other nodes within the system may have their optimal QOS frequencies on other channels and may communicate at the same time and therefore utilizing system bandwidth in the most efficient manner. This yields reliable communication at higher speeds than redundant transmission or traditional spread spectrum techniques.

Security

Each encapsulated Data packet is encoded with CRC error tags and then optionally encrypted using selectable encryption techniques. The receiving node is the only device on the network that maintains the encryption key that allows decryption of the original data therefore security is maintained within a physical encapsulated device.

Seamless Integration Cross-Platforms and Protocols

While implementing the QOS Efficiency Method for Packet Data Throughput the end result of the system architecture is to maintain seamless and dynamic implementation of multiple platforms and network types including and not limited to RF, Powerline, Wireline, Hybrid and Future Networking Systems. By maintaining real time routing and binding tables within the system transport layer of the system information is mapped to determine the most efficient data packet movement between localized nodes bridge routers and information systems.

We map routing and binding tables to map the data type and QOS throughput of data. The intended nodes of receiving the data are provide the most efficient information.

Type, how it got there, probability in the future, where it needs to go, history of QOS and interleave the packets in harmony.

In order to maintain to compatibility with all network standards, we encapsulate the native network standard packet of the existing system, ie. Ethernet, blah,—and append within the encapsulation method the critical tracking data in order to maintain the dynamic adaptability of the system.

This allows upward and downward compatibility of past, present and future compatibility of networking systems.

Scaleability

The encapsulation method is scaleable and open ended to allow any protocol to be contained within the encapsulated data packet sent by the invention. The scaleability allows large or small data transmissions to be maintained in real time and scaled based on data type, priority, and QOS at that moment.

Examples, if you had a system moving a voice wave file for a alert response system and had low priority but at the same time during that transmission you receive a sensor alert that is high priority—the system can request the highest QOS throughput and rescale its transmission length to ensure the fastest response with the highest probability of QOS of the highest probably unexpected packet . . . all while being entirely transparent to the wave file transmission.

This happens in addition to all upper and lower network layer methods, algorithms and processes. The reason that this is critical is in order to be seamlessly compatible with all network topologies and methods. The data being sent must appear in the native format, as well as, with proper timing and overall response that is expected for that native network. This is why you cannot simply incorporate run TCP/IP or other protocols to every node of critical communications systems.

Interphase™—Across All Power Phases

Due to the sensitivity of the receiver and the transmission frequencies of 1–100 MHz the system is capable of maintaining communication across multiple power phases via Bus Bars and Transformer windings that provides communication across phases yielding interphase communication.

A Robust Mode

A redundant transmission scheme on all frequency channels allocated to all nodes within the sub-network. Robust mode provides the highest probability of throughput of any node to any node within the sub-network without the need for dynamic scaleability or trending data. This allows the system to instantly take over the bus and transmit from any node to any node (communicate) with any other node on the sub-network with the highest probability of QOS.

Robust mode can also be used as a learning technique to prepare a network by observing the trending data of QOS trackers that can then be used to transition the system into a full scaleable dynamic sub-network.

The advantage of moving out of robust mode is the increased sub-network speed. This is due to robust mode using all available bandwidth of all frequencies.

Sub-networks can be mixed and match, therefore a higher priority network can be in a robust mode, while a lower priority network can be switched to a full scaleable adaptable mode therefore yielding higher throughput on that particular sub-network.

Declaration of Physical Hardware Identifiers within Encapsulated Network Packets allowing Master Scaleability and Adaptability Maintaining Multiple Sub Networks, similarly Routing and Bridging Performed through Middleware Across Different Types of Networks In addition to the data necessary to move the information, each encapsulated packet also maintains the origination and resulting hardware interface type that was used to generate and terminate the data packet transmission. For example, origination packet may be generated by an Ethernet port while the data packet is to be sent to the destination node resulting in a transfer to an RS-485 serial device. By encapsulating the originating and terminating hardware identifiers, a particular node can maintain many originating and terminating hardware interface types and be network selectable in real-time. Therefore, one packet of data can be sent from Ethernet to 485, and the next packet can go from RS-232 and RS-485 or vice versa.

Multiple Power Phase Cross Channel Noise Cancellation

In industrial and power distribution systems electricity is distributed on multiple power phases typically 3 phases plus an earth ground. By connecting redundant and equivalent signals across each of the phases we maintain a balanced transmission that can be sensed at any point along the transmission line and received differentially while negating the common noise that occurs across the common phases. By maintain multiple differential pairs we additionally use filtering techniques to retrieve the highest quality data after analyzing each of the differential pairs received. This is critical to noise immunity that different power phases have different current draws and load characteristics that change based on weather patterns, time of day and regional presence. By differentially canceling multiple phases of power and analyzing the signals in respect to ground we can process the data through mathematical data error detection, correction, and reconstruction techniques and compare the results for each differential phase received real time.

Packet Protocol Process and Method for Industrial, Military, Commercial and Other Communication Protocols The following gives the basic outline of the packet protocol used to transfer data packets over the power distribution system with the present invention. The following describes a multi-drop mesh network of communication modules or nodes, in which one communication module can have or has many communication modules, connected to it.

Each data packet sent over the power distribution system is broken into three parts, the packet header, the protocol packet payload, and the packet footer. These three parts are combined to form the PLX payload for every packet sent over the power distribution system.

The following chart outlines the PLX packet payload for a specific protocol transporting the specific protocol in a specific mode via the present invention.

TABLE 1

Packet payload outline for protocol packets over a power distribution system.

| Byte | Name | Purpose |
|---|---|---|
| 0 | "!" | Packet Header Byte 1. |
| 1 | "[" | Packet Header Byte 2. |
| 2 | 0xE0 | Header byte for protocol packets. |
| 3 | FCR Byte 2 - Mode/Tries | The Mode/Tries byte from the last FCR. |
| 4 | FCR Byte 4 - Channels | The Channels byte from the last FCR. |
| 5 | Optional filter value (OID) | See Table 2 |
| 6 | House Code filter value (HCF) | Filter out packets based on this byte position. |
| 7 | FCR Byte 1 - CTRL | The control byte from the last FCR. |
| 8–77 | Packet Payload | Payload Data Bytes. |
| Last | "]" or "}" | Packet Footer Byte ("}" = optional footer byte for chunked packet stream). |

There is a byte in the header called OID, or Optional filter value, that helps track and filter protocol packets. This byte is outlined in the table below. The last two bits (outlined in table 3 on the following page) are used within the application firmware for the purpose of re-assembling packets.

TABLE 2

Optional filter value (OID).

| Bit | Purpose |
|---|---|
| 0 | Reserved. |
| 1 | Reserved. |
| 2 | Reserved. |
| 3 | Reserved. |
| 4 | Handshake Byte 1 - RTS. |
| 5 | Handshake Byte 1 - DTR. |
| 6 | Protocol Packet Type Bit 1, see table 3. |
| 7 | Protocol Packet Type Bit 2, see table 3. |

TABLE 3

Packet Type Bits Outline.

| OID6:7 | Description |
|---|---|
| 00 | First and only protocol packet in this transaction. |
| 01 | First protocol packet in a multiple PLX packet stream. |
| 10 | Last protocol packet in a multiple PLX packet stream. |
| 11 | Middle protocol packet in a multiple PLX packet stream. |

Key Protocol Standards

All Protocols have a standards (or rules) that need to be noted for the purpose of explaining some of the power line packet flow. The following is just a list of those standards that are important for packet flow maintenance.

For example and for purposes of description; we shall highlight the Modbus Protocol, a proprietary protocol owned by Schneider Electric, S.A and created by Modicon, Inc. For more information on Modbus; please refer to the Modbus specifications (not contained within this document).

1. Each Modbus packet contains a one-byte address as the first byte in the packet.
2. Each Modbus packet is delimited by a time base of 3.5 characters idle time on the RS-485 (or RS-232) bus.
3. A Modbus packet can contain up to 256 bytes in RTU mode. Modbus also supports ASCII format.
4. Each packet is initiated by a master communication module configured for Modbus to communicate over the power distribution system and requires a response. An exception to this rule is the protocol address 00h, which is a broadcast and yields no response.

Packet Flow Outline

Protocol packets are chunked based on the timing of a Bus, in the Modbus case above it is RS-485. A packet has ended when more the 3 characters worth of time have passed since receiving the last character. The maximum length of a protocol packet with Modbus is 256 bytes.

These standards make it impossible to stream packets over the power distribution system directly due to timing constraints. For this reason the flow of power distribution system data packets must be transported in chunks and reconstructed bi-directionally for both master and slave protocol devices.

Each protocol packet is received from the connection, (in the case of Modbus RS-485 or RS-232) by the application layer and held in a data buffer. As soon as this buffer reaches 57 bytes in the case of Modbus (or an end of packet timeout is reached), a power distribution system data packet transmission is generated.

Since a data packet can span multiple power line packets and power phases it is necessary to tell the receiving node to buffer the incoming power distribution system data packet until all chunks are received. This is done with the Optional filter value (OID), and the packet payload footer byte.

The OID value and the footer of the packet are maintained for each packet as it is generated. If a power distribution system data packet is generated from a specific protocol packet, for example in Modbus, shorter than 58 (transport payload data <=57) bytes then the OID bits 6 and 7 are cleared to 0 and the footer is set to "]".

However if the protocol packet, such as Modbus spans multiple power distribution system data packets then it is necessary for the application to track the first, middle and last chunks. This is done by clearing bit 7 of the OID to 0 on the first power distribution system data packet of a protocol stream, or setting bit 7 to 1 if it is not the first packet in the case of Modbus.

Also, bit 6 of the OID is cleared to 0 anytime the packet is the last packet in the stream, or set to 1 if it is not. These two bits are used to determine the appropriate footer byte for each power distribution system data packet. This footer byte is set to "]" on any packet that ends a stream and is set to "}" for any power distribution system data packet that has more chunks to complete the stream.

With the OID and the footer byte it is possible for the application to buffer the incoming stream of power distribution system data packets until the entire protocol (in this case Modbus) packet has been received. After the entire packet is assembled it is sent out the RS-485 (or RS-232) to the attached protocol device in a contiguous data stream.

The last thing to take into account is addressing of each packet. Each communication module for a power distribution system has a 1 K byte EEPROM lookup table. This address lookup table is pre-loaded via a power distribution system utility before the system will work in a fully addressable mode.

Prior to the lookup table loading, the specific protocol network will access all communication modules in broadcast mode. This is used for communication module or node identification and adding new communication modules to a power distribution system.

After the lookup table has been filled properly, the communication module or nodes located on a power distribution system follow the following logic.

Step 1: Each time a new power distribution system data packet is being generated that contains the first chunk of a new protocol packet, the first byte of that chunk is used to lookup the destination communication module's Mac address in the lookup table.

Step 2: If the lookup table search yield a match to the local Mac address of the sender, then the entire protocol packet is ignored and not sent out on the power distribution system. This is a packet that is meant to stay on the local bus unless a response address is stored and where a response will control packet.

Step 3: Once that first packet of a stream is sent via the power distribution system, the receiving communications module stores the Mac address of the sending communications module. This address will be used for the destination of next protocol packet that comes in from the specific bus (that is addressed to the local communications module). Since the response to a specific protocol master communication module will contain the protocol slave communication module's address as the first byte of the packet this logic is necessary.

Step 4: If a response is expected (i.e.—a response address is stored) and a protocol packet comes in on the connection or bus that does not match the stored protocol address, the stored protocol address is thrown away and the packet is sent out as it normally would be. This ensures that we do not lock up waiting for a response from a communication module slave device.

The specific protocol data traffic is maintained transparently throughout a system and is separated by HouseCodes and Socket settings. Each localized communications module will typically have between 1 to 32 nodes while a structured network may have up to 255 addresses that are accessible to a master communication module or node.

Protocol transactions can be initiated from any point on the network (using a floating master or bridge) and slaves are required to respond to whichever generated the request, creating immediate adaptive networks.

A PC utility, as well as, complete visual tool suite allows automatic and self configuration of a specific or multi protocol network or sub network.

What is claimed is:

1. A Communications Module for communicating over a power distribution system comprising:
    a standard three-dimensional form factor enclosure for integrating communications over a power distribution system across multiple similar or dissimilar network architectures, protocols and platforms;
    a transceiver configured to transmit and receive real-time data over a power distribution system or subsystem;
    a circuit within said transceiver configured to directly and indirectly measure a hindrance to data communication on a power distribution system or subsystem;
    a transceiver controller for controlling communication transmissions on a power distribution system, said transceiver controller providing;
    a circuit with embedded secondary firmware within said transceiver configured to directly and indirectly monitor or hop varying frequencies and signals of multiple power and data carriers within the power supply of a device or system;
    a first adjustment maintaining a number of tracking carriers that repeat data signals to and from all communication devices connected to a power distribution system that are directly or indirectly attached to a power or communication line or frequency allowing communication in real-time over a power distribution system or subsystem;
    a second adjustment for collection of data that is maintained and stores historical repeating signal data;
    a third adjustment for allocation of specific frequencies for communication over a power distribution system to all communication devices on a power distribution system based on the historical repeating signal data;
    a fourth adjustment for reallocation of specific frequencies for communication on a power distribution system to all power and communication devices based on new repeating signal data that becomes different than the historical signal data;
    a fifth adjustment for communicating to and from devices and systems across different power types over a power distribution system or subsystem;
    a sixth adjustment for communicating to and from all communication devices and systems across different power sources over a power distribution system or subsystem;
    a seventh adjustment that secures the data that is being communicated to and from all communication devices containing the communication module, over different power sources over a power distribution system, by encapsulating data packets in their native network language and encoding the data packets with CRC error tags and then optionally encrypting each data packet using user selectable or automatic selectable encryption.

2. The communication module as defined in claim 1, wherein the communication module is comprised of circuitry encased in a three dimensional form factor for integration into a powered device.

3. The communication module as defined in claim 1, wherein the three dimensional form factor is filled with epoxy covering the circuitry and whereby communication pins are protruding on the two longest parallel sides in order to plug into a power supplied communication device.

4. The communication module as defined in claim 1, wherein the epoxy filled form factor has micro cooling tunnels carved throughout the epoxy and around the circuitry providing heat dissipation.

5. The communication module as defined in claim 1, wherein said first adjustment is to a signal level and type that is the highest preferred by said communication frequency on a power line.

6. The communication module as defined in claim 1, wherein said second adjustment maps all signal levels and types that are the highest preferred by said communication line.

7. The communication module as defined in claim 1, wherein said third and fourth adjustment routes all signal levels and types that are the highest preferred by said communication line.

8. The communication module as defined in claim 1, wherein a change in said communication line hindrance is caused by other power and or communication devices sharing said power and or communication line.

9. The communication module as defined in claim 1, wherein said fifth and sixth adjustments are carried out by maintaining a specific sensitivity of the receiver and by communicating over varying power phases and varying power types on specific frequencies between 1 and 100 MHz.

10. The communication module as defined in claims 1, 2, 3, 4, 5, 6, wherein said adjustments allow the storage and retrieval of real time and historical routing and binding data of all power and communication devices attached to a power distribution system where that data is maintained for specified periods of time in order to determine appropriate signal levels of communications for each power and communication device sending data to and from the power communication module over a power distribution system.

11. The communication module as defined in claim 1, and wherein real time and historical routing and binding data that is sent to and from all communication devices over a power distribution system for the purposes of communicating to and from each other, each data packet that is sent from the communication module to a specific device or system, is encapsulated with that devices or systems specific native communication standard thus allowing data distribution with other communication modules over a power distribution system; each encapsulated data packet is appended with specific real time tracking data to maintain real time communication with the device or system connected for the purposes of communicating with the communication module.

12. The communication module as defined in claim 1, wherein said transceiver has a plurality of frequencies, and which are associated with a plurality of distortion and inter-modulation products, that are detected to determine said signal level that is the highest preferred by said power communication line over a power distribution system.

13. A method for transmitting communications over a power distribution system comprising the steps of:
configuring a transceiver to transmit and receive data within a power supplied device over a power distribution system having a plurality of communicating devices encompassing the communications module;
configuring circuitry within said transceiver to directly and indirectly measure a signal hindrance of the communication line;
controlling communication transmissions over a power distribution system with a transceiver controller by:
providing a first adjustment, based on said communication line hindrance, to a signal level used in reception to and from said transceiver;
providing a second adjustment, based on an indirect measurement of said communication line hindrance with said communication module, to said signal level used in reception to and from said transceiver;
providing a third adjustment, based on allocating specific frequencies for communication on a power distribution system to all communicating devices containing a communication module using the historical repeating and repeated signal data that has been sent and received from varying communicating devices over a power distribution system;
providing a fourth adjustment, based on the reallocation of specific frequencies for communicating over a power distribution system to and from all power and communication devices based on new repeating and repeated signal data that is received differently than the preceding and historical signal data;
providing a fifth adjustment, based on communicating to and from devices and systems across different power phases by maintaining a specific sensitivity level within the receiver and by communicating on specific frequencies between 1 and 100 MHz;
providing a sixth adjustment, based on communicating to and from devices and systems having different power sources by maintaining a specific sensitivity level within the receiver and by communicating on specific frequencies between 1 and 100 MHz.

14. The method of claim 13, further comprising the step of providing said first adjustment to a signal level that is the highest preferred by said communication module and communication line over a power distribution system.

15. The method of claim 14, further providing the step of providing said first adjustment to a lower signal level than said signal level that is the highest preferred by said communication module and communication line over a power distribution system.

16. The method of claim 15, further comprising the step of directly and indirectly measuring said power communication line hindrance that is caused by other power and communication devices connected or sharing said communication line over a power distribution system.

17. The method of claim 16, further comprising the step of determining said communication line hindrance to be higher than a typical power line hindrance and providing said first adjustment to said signal level that is the highest preferred by said communication module and communication line over a power distribution system.

18. The method of claim 17, further comprising the step of maintaining said signal level that is the highest preferred by said communication module and communication line for a specified period of time in order to determine an appropriate signal level for communications over a power distribution system.

19. The method of claim 18, further comprising the step of determining said communication line hindrance to be lower than said typical power hindrance and providing said first adjustment to a signal level lower than said signal level that is the highest preferred by said communication module and communication line over a power distribution system.

20. The method of claim 19, further comprising the step of determining that said communication line hindrance is approximately equal to said power line hindrance and providing said first adjustment to said signal level that is the highest supported by said communication module and communication line over a power distribution system.

21. The method of claim 20, further comprising the step of determining that said communication line hindrance is close to zero compared to said typical power line hindrance and providing said first adjustment to said signal level that is the highest preferred by said communication module and communication line over a power distribution system.

22. The method of claim 21, further comprising the step of maintaining said signal level that is the highest preferred by said communication module and line for said specified period of time in order to determine said appropriate signal level for transmission over said communication line over a power distribution system.

23. The method of claim 22, further comprising the step of determining said signal level that is the highest preferred by said communication module and communication line by measuring a plurality of frequencies produced by a test signal's plurality of distortion and inter-modulation products located on the power line over a power distribution system.

* * * * *